(12) United States Patent
Ohmori et al.

(10) Patent No.: US 10,773,621 B2
(45) Date of Patent: Sep. 15, 2020

(54) VEHICLE SEAT WITH RECLINING MECHANISM

(71) Applicant: TACHI-S CO., LTD., Akishima-shi, Tokyo (JP)

(72) Inventors: Takayuki Ohmori, Tokyo (JP); Akira Watanabe, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/093,644

(22) PCT Filed: Apr. 28, 2017

(86) PCT No.: PCT/JP2017/017082
§ 371 (c)(1),
(2) Date: Oct. 14, 2018

(87) PCT Pub. No.: WO2017/199739
PCT Pub. Date: Nov. 23, 2017

(65) Prior Publication Data
US 2019/0070990 A1 Mar. 7, 2019

(30) Foreign Application Priority Data

May 20, 2016 (JP) ................................. 2016-101805

(51) Int. Cl.
B60N 2/68 (2006.01)
B60N 2/22 (2006.01)

(52) U.S. Cl.
CPC ............... *B60N 2/682* (2013.01); *B60N 2/22* (2013.01)

(58) Field of Classification Search
None
See application file for complete search history.

(56) References Cited

U.S. PATENT DOCUMENTS

| 4,275,924 | A | 6/1981 | Lehmann et al. |
| 2007/0200408 | A1 | 8/2007 | Ohta et al. |

(Continued)

FOREIGN PATENT DOCUMENTS

| CN | 104512293 A | 4/2015 |
| GB | 2 112 851 A | 7/1983 |

(Continued)

OTHER PUBLICATIONS

International Search Report from International Patent Application No. PCT/JP2017/017082, dated Jun. 27, 2017.

(Continued)

*Primary Examiner* — David R Dunn
*Assistant Examiner* — Christopher E Veraa
(74) *Attorney, Agent, or Firm* — SGPatents PLLC

(57) ABSTRACT

In a conventional vehicle seat with a reclining mechanism, a reclining unit is bolted to a seat frame. Consequently, a plate thickness has to be increased in order to ensure strength and a fastening bolt is required, producing factor which increases the number of parts. In order to solve the above-mentioned problem, this vehicle seat with a reclining mechanism is configured such that a reclining unit (2) which has the reclining mechanism (5) is affixed to a back side frame (3) and a cushion side frame (40), which constitute the seat frame of the vehicle seat. The reclining unit (2) has the reclining mechanism (5), a movable bracket (6) which is affixed to the back side frame (3), and a stationary bracket (7) which is affixed to the cushion side frame (40). The reclining unit (2) is configured such that the reclining unit (2) is affixed to the back side frame (3) through the movable bracket (6) by welding and is fastened to the cushion side frame (40) by a bolt through the stationary bracket (7).

3 Claims, 5 Drawing Sheets (A)

(B)

(56) References Cited

U.S. PATENT DOCUMENTS

| | | | |
|---|---|---|---|
| 2010/0187886 A1 | 7/2010 | Yamada et al. | |
| 2012/0139315 A1* | 6/2012 | Yamada | B60N 2/688 297/354.1 |
| 2012/0325780 A1 | 12/2012 | Kushiyama et al. | |
| 2013/0249267 A1 | 9/2013 | Hosokawa | |
| 2015/0091354 A1 | 4/2015 | Enokijima et al. | |
| 2016/0355107 A1* | 12/2016 | Wahlen | B60N 2/68 |

FOREIGN PATENT DOCUMENTS

| | | | |
|---|---|---|---|
| JP | 58-118714 A | 7/1983 | |
| JP | 1984-91157 U | 6/1984 | |
| JP | 1985-34256 U | 3/1985 | |
| JP | 07-132767 A | 5/1995 | |
| JP | 2000-102441 A | 4/2000 | |
| JP | 2007-229055 A | 9/2007 | |
| JP | 2011-230624 A | 11/2011 | |
| JP | 2013-027922 A | 2/2013 | |
| JP | 2013-193586 A | 9/2013 | |
| JP | 2014-189231 A | 10/2014 | |
| WO | WO 2009/066533 A1 | 5/2009 | |
| WO | WO 2016/047562 A1 | 7/2017 | |

OTHER PUBLICATIONS

Office Action dated Jun. 2, 2020, in Chinese Patent Application No. 201780024257.2.

Office Action dated Jun. 23, 2020, in Japanese Patent Application No. 2018-518203.

* cited by examiner

VEHICLE SEAT WITH RECLINING MECHANISM

TECHNICAL FIELD

The present invention relates to a vehicle seat with reclining mechanism, in particular, relates to a frame structure thereof.

BACKGROUND ART

There is a vehicle seat with reclining mechanism including, what is called, a walk-in mechanism. In addition to an operation for changing angle of a seat back, the walk-in mechanism enables to instantaneously make a seat back fall forward, for example, when an occupant moves to a back seat by opening a front side door in a two door coupe.

As a background art in this technical field, there is Japanese Patent Application Laid-Open No. 2007-229055 (PTL 1). PTL 1 discloses a mechanism configured to separate a reduction unit and a forward-inclination mechanism so as to achieve commonized components between an electrical type and a manual type.

As a seat reclining apparatus, it is configured that seat reclining units 1A and 1B are disposed on left and right sides of a seat, and the seat reclining units 1A and 1B are connected through a connecting shaft 2. The respective seat reclining units include a stationary bracket 3 provided integral with a seat cushion and a movable bracket 4 provided integral with a seat back. The seat back is attached between the right-side and left-side movable brackets 4 while the seat cushion is attached between the right-side and left-side stationary brackets 3, to be configured to turn about the connecting shaft 2 with respect to the seat cushion.

CITATION LIST

Patent Literature

PTL 1: Japanese Patent Application Laid-Open No. 2007-229055

SUMMARY OF INVENTION

Technical Problem

In PTL 1, in order to respectively integrate the seat cushion and the seat back with the stationary bracket 3 and the movable bracket 4, the stationary bracket 3 and the movable bracket 4 are respectively bolted to a cushion side frame of the seat cushion and a back side frame of the seat back through holes for connection. In view of this, the bracket needs its plate thickness to be thick for ensuring strength. Furthermore, fastening bolts are needed, thus causing a factor that increases the number of components.

The present invention has been made in consideration of these problems, and it is one of its objectives to provide a vehicle seat with reclining mechanism that ensures thin plate thicknesses of respective portions and reduces fastening bolts to reduce the number of components, and ensures achieving a weight reduction.

Solution to Problem

One example of the present invention in order to solve the above-described problems is, a vehicle seat with reclining mechanism in which a reclining unit including a reclining mechanism is secured to a back side frame and a cushion side frame constituting a seat frame of the vehicle seat. The reclining unit includes the reclining mechanism, a movable bracket, and a stationary bracket. The movable bracket secures the reclining unit to the back side frame. The stationary bracket secures the reclining unit to the cushion side frame. The reclining unit is secured to the back side frame via the movable bracket by welding and is bolted to the cushion side frame via the stationary bracket.

Advantageous Effects of Invention

With the present invention, a vehicle seat with reclining mechanism that thins plate thicknesses and reduces the number of components, and ensures achieving a weight reduction can be provided.

DESCRIPTION OF EMBODIMENTS

The following describes an example of the present invention with reference to the drawings.

EXAMPLE

Figure 5:
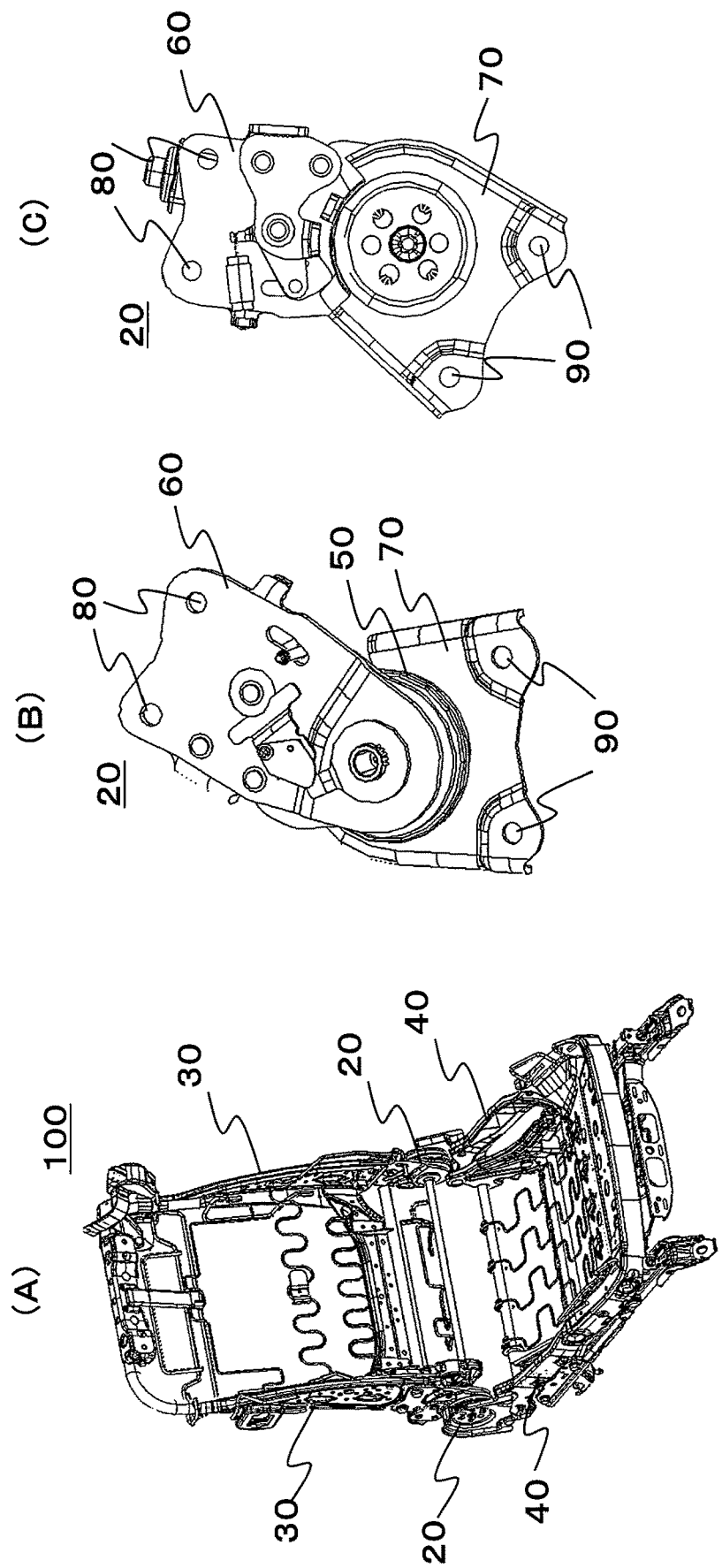
FIG. 5 includes structural drawings of a frame for a vehicle seat with reclining mechanism and a reclining unit in a conventional example.

First, a description will be given of a conventional vehicle seat with reclining mechanism as a prerequisite of the present invention. FIG. 5 illustrates structural drawings of a frame for a vehicle seat with reclining mechanism and a reclining unit in a conventional example. (A) illustrates a structural drawing of a seat frame structure for vehicle, and (B) and (C) illustrate structural drawings of a reclining unit 20.

In FIG. 5(A), the reclining units 20 are disposed on right and left sides of a seat frame 100. The reclining unit 20 achieves an angle change of a seat back and a function to instantaneously make the seat back fall forward. The respective reclining units 20 are secured to back side frame 30 and cushion side frame 40. FIG. 5(B) is a structural drawing when the reclining unit 20 is viewed from a mounting surface side to the seat frame 100. FIG. 5(C) is a structural drawing when the reclining unit 20 is viewed from a surface that comes outside after being mounted to the seat frame 100. As illustrated in FIG. 5(B) and FIG. 5(C), the reclining unit 20 includes a reclining mechanism 50, a movable bracket 60 that secures the reclining unit 20 to the back side frame 30, and a stationary bracket 70 that secures to the reclining unit 20 the cushion side frame 40. The movable bracket 60 has holes for bolting 80 and the stationary bracket 70 has holes for bolting 90. The reclining unit 20 is bolted to the back side frame 30 and the cushion side frame 40 through the holes for bolting 80 and 90 and secured. In view of this, the movable bracket 60 on a seat back side, which is movable, in particular, needs to have its plate thickness thick in order to ensure strength. Furthermore, eight fastening bolts are necessary on the right and left sides together, thus producing a factor that increases the number of components.

Accordingly, in this example, the movable bracket is secured to the back side frame by welding in order to solve the above-described problems. The following describes the example with reference to the drawings.

Figure 1:
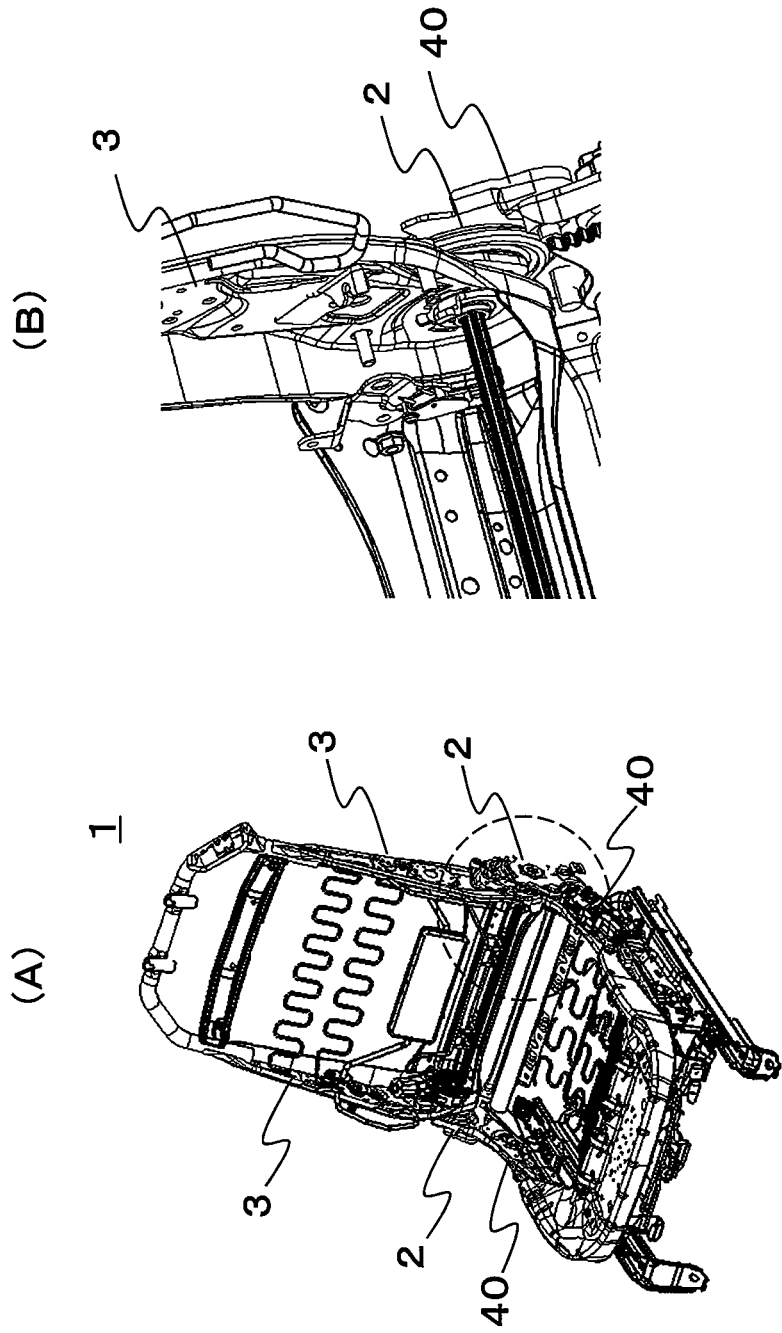
FIG. 1 includes frame structural drawings of a vehicle seat with reclining mechanism according to an example.

FIG. 1 includes frame structural drawings of a vehicle seat with reclining mechanism according to the example. In FIG. 1, configurations having functions similar to that in FIG. 5 are attached by identical reference numerals, and the descriptions are omitted. FIG. 1 is different from FIG. 5 in that a reclining unit 2 is secured to a back side frame 3 by welding. Therefore, the reclining unit 2 and the back side frame 3 have structures necessary for welding, compared with conventional ones. It should be noted that, in the example, securing the reclining unit 2 to the cushion side frame 40 is secures by bolting as conventional. FIG. 1(A) illustrates a structure of a seat frame 1. FIG. 1(B) illustrates a drawing that enlarges a fastening portion of the reclining unit 2 to the back side frame 3 and the cushion side frame 40 enclosed in a circular dotted line in FIG. 1(A).

The following describes the detail.

Figure 2:
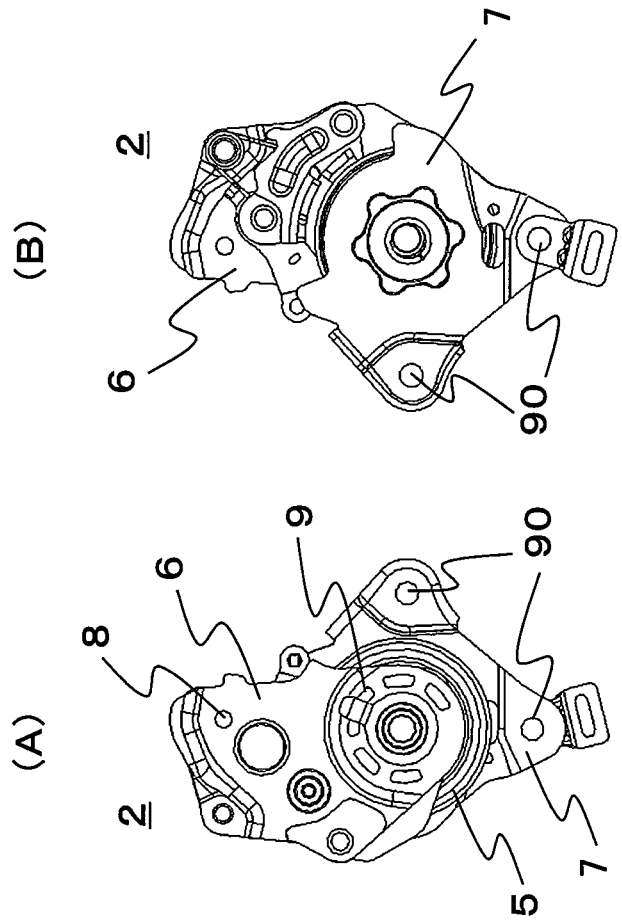
FIG. 2 includes structural drawings of a reclining unit according to the example.

FIG. 2 includes structural drawings of the reclining unit 2 according to the example. FIG. 2(A) is a structural drawing when the reclining unit 2 is viewed from a mounting surface side to the seat frame 1. FIG. 2(B) is a structural drawing when the reclining unit 2 is viewed from a surface that comes outside after being mounted to the seat frame 1. As illustrated in FIG. 2(A) and FIG. 2(B), the reclining unit 2 includes a reclining mechanism 5, a movable bracket 6 that secures the reclining unit 2 to the back side frame 3, and a stationary bracket 7 that secures the reclining unit 2 to the cushion side frame 40. The movable bracket 6 has a hole for positioning 8 for welding and a protrusion 9. The stationary bracket 7 has the hole for bolting 90 similarly to the conventional one.

Figure 3:
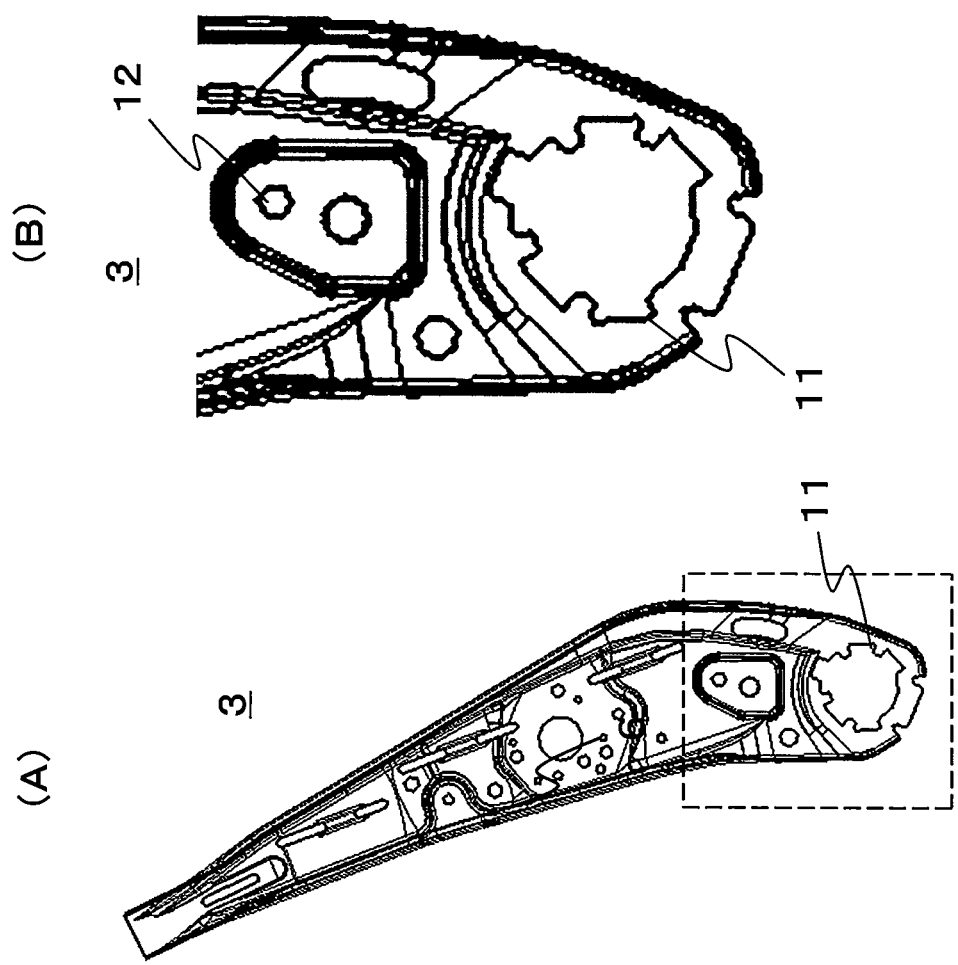
FIG. 3 includes structural drawings of a back side frame according to the example.

FIG. 3 includes structural drawings of the back side frame 3 according to the example. FIG. 3(A) is an overall structural drawing. FIG. 3(B) illustrates a drawing that enlarges a portion fastening the reclining unit 2 enclosed in a square dotted line in FIG. 3(A). As illustrated in FIG. 3(B), the back side frame 3 has a cutout portion 11 and a hole for positioning 12 for fastening the reclining unit 2 by welding.

The following describes a method for fastening the reclining unit 2 to the seat frame 1.

Figure 4:
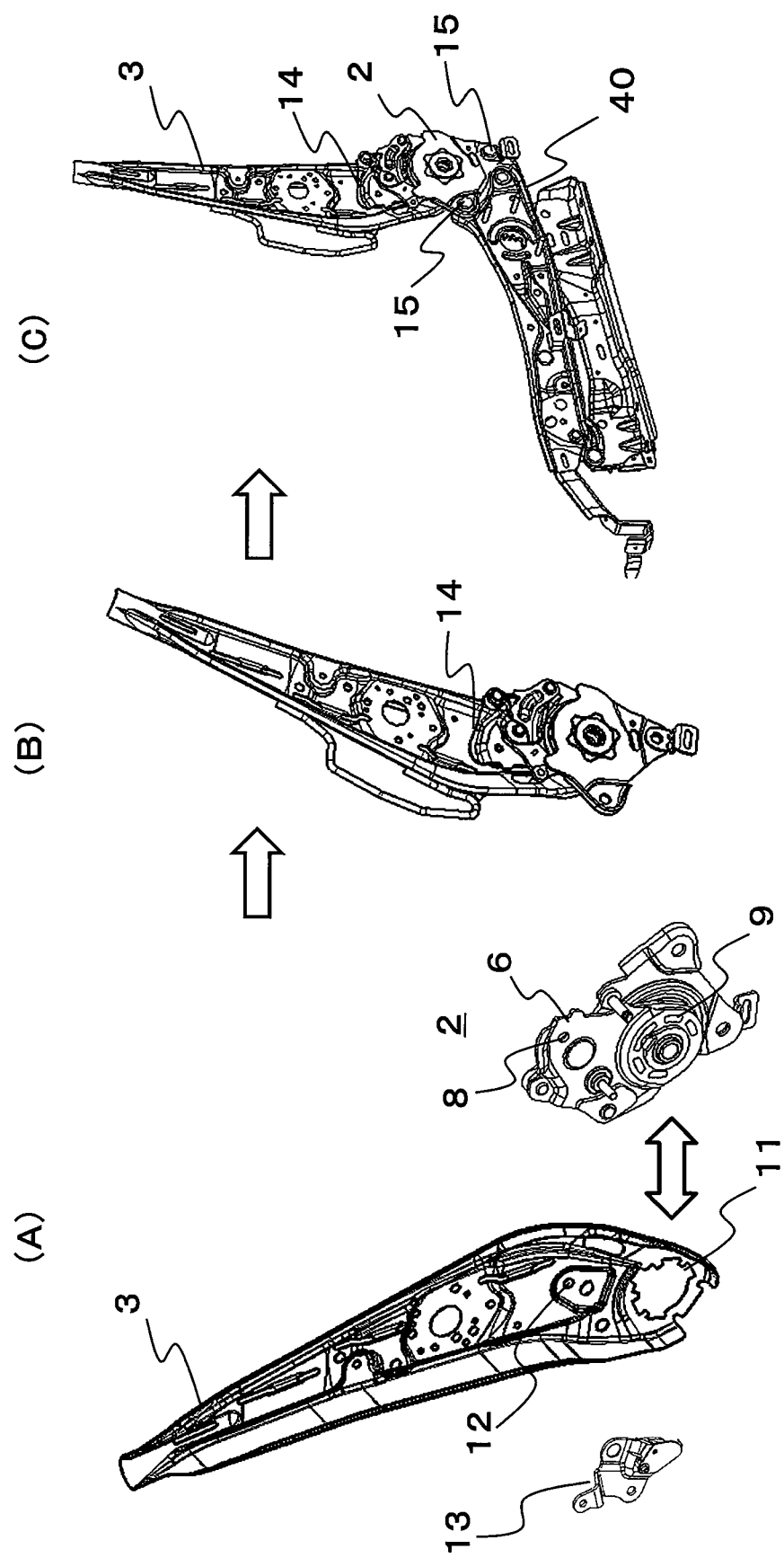
FIG. 4 includes drawings describing an assembling process of the reclining unit to a seat frame according to the example.

FIG. 4 are drawings describing an assembling process of the reclining unit 2 to the seat frame 1 according to the example. In FIG. 4, (A) illustrates a state before fastening. The cutout portion 11 and the hole for positioning 12 of the back side frame 3 are positioned by pins for positioning disposed in a jig for assembling so as to engage with the protrusion 9 and the hole for positioning 8 of the reclining unit 2, and welding is performed. (B) illustrates a state where the reclining unit 2 is secured to the back side frame 3 by welding. As welded portions, it is preferred to weld a weld portion 14 at an end portion of the movable bracket 6 illustrated in (B), in addition to the portion of the cutout portion 11 and the protrusion 9.

(C) illustrates a state where the cushion side frame 40 is secured with bolts 15 to a sub-assembly of the back side frame and the reclining unit illustrated in (B), further through the holes for bolting 90 of the stationary bracket 7 of the reclining unit 2.

It should be noted that, FIG. 4(A) illustrates a sub-assembly 13 of a limit switch. The limit switch turns off a power source of a motor used for an angle change operation of an electrically operated type seat back when the seat back falls forward. The sub-assembly 13 of the limit switch is bolted when the motor of the reclining unit is assembled after the assembly of the seat frame 1 is completed.

As described above, the example secures the movable bracket of the reclining unit to the back side frame by welding. This ensures thinning the plate thickness of the movable bracket and ensures reducing the fastening bolts, thereby ensuring the reduced number of components. The reduced plate thickness and the reduced fastening bolts ensure achieving a weight reduction.

In order to weld the movable bracket of the reclining unit to the back side frame, the reclining unit 2 has the hole for positioning 8 and the protrusion 9, and the back side frame 3 has the cutout portion 11 and the hole for positioning 12.

The present invention ensures providing the vehicle seat with reclining mechanism that thins the plate thicknesses and reduces the number of components, and ensures achieving the weight reduction.

While the example has been described above, the present invention is not limited to the above-described examples, and includes various modifications. The above-described examples are described in detail for simply describing the present invention, and do not necessarily include all the described configurations. A part of the configurations of the example can be replaced by the configuration of another example.

REFERENCE SIGNS LIST

1 . . . seat frame,
2 . . . reclining unit,
3 . . . back side frame,
5 . . . reclining mechanism,
6 . . . movable bracket,
7 . . . stationary bracket,
8 . . . hole for positioning,
9 . . . protrusion,
11 . . . cutout portion,
12 . . . hole for positioning,
13 . . . sub-assembly of limit switch,
14 . . . weld portion,
15 . . . bolt,
40 . . . cushion side frame,
90 . . . hole for bolting.

The invention claimed is:

1. A vehicle seat including a reclining unit secured to a back side frame and a cushion side frame constituting a seat frame of the vehicle seat, the reclining unit including:
a reclining mechanism;
a movable bracket; and
a stationary bracket,
the movable bracket securing the reclining unit to the back side frame, and the stationary bracket securing the reclining unit to the cushion side frame,
wherein the reclining unit is welded to the back side frame via the movable bracket, and is bolted to the cushion side frame via the stationary bracket,
wherein the movable bracket has a through-hole for positioning and a protrusion, and the back side frame has a through-hole for positioning and a cutout portion,
the cutout portion and the through-hole for positioning of the back side frame being positioned so as to be engaged with the protrusion and the through-hole for positioning of the movable bracket, the protrusion being welded to the cutout portion.

2. The vehicle seat according to claim 1,
wherein the movable bracket has an end portion welded to the back side frame.

3. The vehicle seat according to claim 1,
wherein the stationary bracket has a through-hole for bolting, and the reclining unit is bolted to the cushion side frame through the through-hole for bolting.

\* \* \* \* \*